Patented Dec. 3, 1929

1,737,555

UNITED STATES PATENT OFFICE

JAMES PIERCE BALDWIN, OF LOS ANGELES, CALIFORNIA

LUBRICANT

No Drawing.   Application filed February 14, 1925.   Serial No. 9,299.

My invention relates to lubricant compositions and has for its particular object to produce a lubricant which is adapted for use in friction shock absorbers of the type shown in my Patent No. 1,521,588.

The shock absorber disclosed in this patent is of the running or sliding clutch type, comprising a base having an internal cylindrical friction surface, a core arranged axially of this friction surface, three friction shoes having cylindrical friction faces, and means to thrust these shoes radially outward with great force against the friction surface when relative movement of the base and core occurs in one direction. The maintenance of a film of lubricant between the leathers of the friction shoes and the metallic friction surface of the base is necessary for the successful operation of the shock absorber. Obviously, however, the lubricant employed must not result in too free slippage of the shoes along the friction surface nor, on the other hand, cause too great a coefficient of friction between the friction surfaces.

The problem of proper lubrication for friction shock absorbers of this type is by no means easy of solution. There are certain characteristics which the lubricant should possess and lacking any one of which it is bound to be more or less of a failure. First, and most important, the lubricant should produce a coefficient of friction which increases with an increase in velocity of the friction surfaces and decreases with a decreasing velocity; that is, the coefficient of friction should vary directly with the velocity of the friction surfaces. Second, the lubricant should have such durability as regards consistency and lubricating characteristics that it does not have to be renewed during the average life of the shock absorber. Third, the lubricant should have such consistency that it may be retained in the shock absorber housing without the necessity of expensive mechanical construction to insure such retention. Fourth, it should be of such a nature that it will have great wear-resisting qualities and yet produce a high co-efficient of friction as compared to the general run of lubricated surfaces.

So far as I am aware, none of the commercial greases, solid lubricants, oils, or compositions heretofore known possess all of the above mentioned characteristics, and therefore none are entirely satisfactory for use in a friction shock absorber.

There are some commercial greases which give satisfactory results for short times, but under the intense pressures to which they are subjected in a shock absorber their component ingredients soon separate and the mineral oil, which is an ingredient of practically all present day commercial greases forms a film on the friction surfaces, which renders the device practically inoperative. The relative abilities of various lubricants to withstand rupture under pressure I designate their relative stabilities. Thus, by describing a lubricant as having a high stability, I mean to indicate that a film of such lubricant will not readily rupture under pressure. Conversely, a film of oil of low stability will rupture rather readily under pressure. Mineral oil films are of such low stabilities that they readily rupture under the pressures incident to shock absorber usage to such an extent that seizing takes place between the friction surfaces at low velocities, whereas at high velocities the opposite occurs; that is, the surfaces slip and the device fails to function properly. Thus, a shock absorber of the type referred to, if lubricated with an oil of low stability, will offer an extremely heavy resistance to spring movement on smooth roads where the spring movements are very slight, but will offer very little resistance on rough roads where the spring movements are of greater amplitude and higher velocity.

Those fixed oils, such as castor oil, lard oil and neat's-foot oil, which have high stabilities and which produce coefficients of friction which vary directly with velocity, will also produce goods results for a short time. However, I have found by a large number of experiments that these so-called fixed oils and various blends thereof are unsatisfactory, in that, under long continued use the coefficient of friction between the rubbing surfaces was found to be decreased due to the gradual accumulation on the friction surfaces of some element contained by the oil.

I have discovered that a lubricant composition consisting of a solid lubricant, such as graphite, and a fixed oil, such as castor oil or neat's-foot oil, in certain proportions, possess all the necessary characteristics for use in a friction shock absorber. The proportion of graphite to oil may be varied within considerable limits, but the proportion should be such as to produce a lubricant of semifluid consistency, or about the consistency of pancake batter at approximate atmospheric temperatures or the normal atmospheric temperatures in which the lubricant is intended to be used. It should be noted in this connection that my composition is a radical departure from the generally accepted practice as regards the addition of graphite to lubricating oils. The customary addition to the oil of relatively small amounts of graphite has the effect of lowering the coefficient of friction between the rubbing surfaces of shock absorbers of the sliding clutch type, to such an extent as to render, for instance, a shock absorber of the type disclosed in my patent practically inoperative, if filled with such a lubricant. On the other hand, I have discovered that the addition of a considerable quantity of graphite materially increases the coefficient of friction between the rubbing surfaces.

Where non-drying fixed oils, such as castor oil, are used, it is advantageous to add a small quantity of mineral lubricating oil, to prevent destruction or drying up of the oil due to friction or heat or both which prolongs very materially the life of the composition. The quantity of mineral lubricating oil to be added is largely determined by the miscibility of the two oils used. For example, castor oil is miscible with approximately 17% of American pale mineral lubricating oils. Therefore 17% or less of these mineral lubricating oils may be used in the composition without an appreciable loss of any desirable lubricating qualities. On the other hand, if 20% or more of the same mineral lubricating oil is added to the composition, the lubricating effects will begin to show the characteristics of straight mineral oil lubrication; that is to say, the miscible portion of the mineral lubricating oil which is contained in the composition will separate from the mass and tend to produce the same results as if straight mineral lubricating oil lubrication were used.

The process of combining the various materials to form the lubricant is simple. The proper quantity of each ingredient, for a given mixture, is determined by weighing, and the ingredients are then placed in a common receptacle and stirred until fully and thoroughly mixed. The lubricant is then ready for use. The process is carried out in this manner whether a mineral oil is added, or not. Where graphite is mixed with either lard oil or neat's-foot oil, instead of castor oil, the process of admixture is exactly the same.

Obviously the relative proportion of the ingredients composing the lubricant will be also influenced by the viscosity of the mineral lubricating oil used and the size of the solid lubricant particles, as well as by the coefficient of friction desired. The mass should be of a cohesive semi-fluid slowly flowing consistency similar to that of medium pan cake batter at normal atmospheric temperatures. A compound having such qualities is possible when made of these three ingredients varying in graphite content as much as from 33% to 49%, in fixed oil content as much as from 40% to 59%, and in mineral lubricating oil content as much as from 4% to 17%.

A compound proportioned by weight and consisting of 54% castor oil, 36% finely divided graphite, and 10% mineral lubricating oil of medium viscosity, will give excellent results and form a mass of desirable consistency. A lower coefficient of friction between the rubbing surfaces may be obtained by increasing the oil content and a higher coefficient may be obtained by increasing the graphite content. In the following claims the various percentages of the ingredients set forth are based on the weight of the mixture.

I claim:

1. A lubricant for shock absorbers of the general type specified, including graphite and a fixed oil of the group consisting of castor oil, lard oil and neat's-foot oil, the graphite comprising at least one-third, by weight, of the lubricant.

2. A lubricant for shock absorbers of the general type specified, including castor oil and graphite, the graphite comprising at least one third, by weight, of the lubricant.

3. A lubricant for shock absorbers of the general type specified, including graphite, a fixed oil of the group consisting of castor oil, lard oil and neat's-foot oil, and a mineral lubricating oil, the resulting lubricant having at ordinary temperatures a semi-fluid consistency and the mineral oil present not substantially exceeding the maximum amount of mineral oil mixable with the fixed oil.

4. A lubricant for shock absorbers of the general type specified, including powdered graphite, castor oil and mineral lubricating oil, the graphite comprising at least one-third and the castor oil at least four-tenths, by weight, of the composition.

5. A lubricant for shock absorbers of the general type specified, comprising, by weight, 36% powdered graphite, 54% castor oil, and 10% mineral lubricating oil.

In testimony whereof I hereunto affix my signature.

JAMES PIERCE BALDWIN.